United States Patent
Takano

(10) Patent No.: US 8,036,299 B2
(45) Date of Patent: Oct. 11, 2011

(54) WIRELESS COMMUNICATION APPARATUS, ANTENNA CALIBRATION METHOD, AND COMPUTER PROGRAM

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/090,224

(22) PCT Filed: Oct. 5, 2006

(86) PCT No.: PCT/JP2006/319978
§ 371 (c)(1),
(2), (4) Date: Sep. 1, 2009

(87) PCT Pub. No.: WO2007/046245
PCT Pub. Date: Apr. 26, 2007

(65) Prior Publication Data
US 2010/0067588 A1  Mar. 18, 2010

(30) Foreign Application Priority Data
Oct. 21, 2005  (JP) .................................. 2005-306619

(51) Int. Cl.
*H04L 1/02* (2006.01)
*H04B 7/02* (2006.01)

(52) U.S. Cl. ........ 375/267; 375/295; 375/299; 375/347; 375/349; 455/101; 455/103; 455/500; 455/526

(58) Field of Classification Search .................. 375/267, 375/295, 299, 347, 349; 455/101, 103, 500, 455/526; 370/203–211
See application file for complete search history.

(56) References Cited

U.S. PATENT DOCUMENTS

2003/0227408 A1* 12/2003 Sanada et al. ................. 342/174
2006/0209765 A1   9/2006 Li et al.

FOREIGN PATENT DOCUMENTS

| JP | 2002-44051 | 2/2002 |
| JP | 2003-124731 | 4/2003 |
| JP | 2003-264492 | 9/2003 |
| JP | 2004-260373 | 9/2004 |

OTHER PUBLICATIONS

IEEE (The Institute of Electrical and Electronics Engineers) 802.11 (http://radio3.ee.uec.ac.ip/IEICE_TB_web.pdf).

* cited by examiner

*Primary Examiner* — Curtis Odom
(74) *Attorney, Agent, or Firm* — Finnegan, Henderson, Farabow, Garrett & Dunner, L.L.P.

(57) ABSTRACT

Reversibility in the directivity in the event of transmission/reception through a multi-antenna system is well suitably compensated for by executing self-calibration. A branch is set to a reference branch, and a forward loopback transfer function and a backward loopback transfer function are acquired, whereby per-branch calibration factors are calculated. Subsequently, an other branch is set to a reference branch, and calibration factors are calculated in a similar manner. Then, the calibration factor for the reference branch is corrected in accordance with the secondly obtained calibration factor so that a calibration condition is satisfied.

9 Claims, 3 Drawing Sheets

WIRELESS COMMUNICATION APPARATUS, ANTENNA CALIBRATION METHOD, AND COMPUTER PROGRAM

TECHNICAL FIELD

The present invention relates to a wireless communication apparatus that includes multiple antennas and that executes high-throughput wireless data transmission, and more particularly the invention relates to a wireless communication apparatus, an antenna calibration method, and a computer program for compensating for a characteristic difference between each of the multiple antenna elements in transmission and reception.

More specifically, the present invention relates to a wireless communication apparatus including a plurality of antennas and for executing calibration to attain a match between transmission and reception directivity patterns of an overall antenna system, and the invention further relates to an antenna calibration method and a computer program. More specifically, the invention relates to a wireless communication apparatus for compensating for the reversibility of transmission and reception directivities of the multi-antenna system by executing self-calibration with which a compensation process is completed within the device. The invention further relates to an antenna calibration method and a computer program therefor.

BACKGROUND ART

As apparatuses to be relieved from wirelines in conventional wired communication apparatus, wireless networks have been drawing attention. Among standard specifications related to wireless networks, IEEE (The Institute of Electrical and Electronics Engineers) 802.11, for example, is known.

For example, as a standard specification regarding wireless LANs, in IEEE 802.11a/g there is employed an OFDM (Orthogonal Frequency Division Multiplexing) modulation scheme, which is one of multicarrier scheme. According to the OFDM modulation scheme, because transmission data is transmitted by being distributed to a plurality of carriers set with frequencies perpendicular to one another. As such, the band of the respective carrier is narrow, in which case the frequency utilization efficiency is very high, and the resistance against frequency selectivity phasing disturbance is high.

Further, according to the IEEE 802.11a standard, although a modulation scheme capable of achieving a communication speed of 54 Mbps at maximum is supported, a wireless communication standard enabling the accomplishment of even higher bit rates is demanded. Wireless communication techniques enabling high-throughput wireless data transmission include a multi-antenna system in which a communication apparatus includes multiple antennas.

An adaptive array antenna is widely known as one example of multi-antenna techniques. According to the technique, the gains of respective antenna elements are controlled, and appropriate transmission and reception antenna directivities are acquired, thereby to support communications. More specifically, appropriate weight coefficients are multiplied with reception signals received via respective antenna elements, and the results are summed up, thereby to execute control of the reception directivity pattern as the directivity pattern of the overall array antenna system. Alternatively, after appropriate antenna element weight coefficients are multiplied with respective transmission signal, the respective transmission signals are transmitted via the respective antenna elements, thereby to control the transmission directivity pattern as the directivity pattern of the overall array antenna system.

For such an array antenna, there is a sector-antenna-wise method that directs only a main lobe along a desired direction, but does not emit unnecessary radio waves via low side lobes along an undesired direction. In addition, there is a method for improving a SINR (signal-to-interference-and-noise ratio) in the manner that the main lobe is directed along a direction of a desired mobile station, but null is directed to an interferential mobile station.

As another example of a wireless communication apparatus utilizing a multi-antenna system, a MIMO (Multi-Input Multi-Output) communication technique has been drawing attention. The technique is based on a communication apparatus in which pluralities of antenna elements are provided on the respective sides of a transmitter and a receiver, thereby to realize pluralities of spatially multiplexed MIMO channels. On the side of the transmitter, transmission data transmitted by being distributed into a plurality of streams by using a plurality of antennas, and on the side of the receiver, signal processing is executed on the space signals received via the plurality of antennas, and the signal in each of the streams is extracted without crosstalk (refer to Patent Publication 1, for example). For example, in IEEE802.11n, the OFDM_MIMO system using OFDM for the primary modulation is employed. According to the MIMO communication scheme or system, an increase in transmission capacity can be implemented corresponding to the number of antennas, and improvement of the communication speed can be accomplished without introducing an increase in frequency band.

As a representative example of the MIMO communication apparatus, an SVD-MIMO system using singular value decomposition (SVD) of a channel function H (refer to Non-patent Publication 1, for example). In SVD-MIMO transmission, $UDV^H$ is acquired by executing singular value decomposition of a numeric value matrix formed from elements of channel information corresponding to a respective antenna pair, that is, a channel information matrix H, whereby V is provided as an antenna weight coefficient matrix on the transmitting side, and $(UD)^H$ is provided as an antenna weight coefficient matrix on the receiving side (where U and V are unitary matrixes, and D is a diagonal matrix). Thereby, the respective MIMO channel is represented as the diagonal matrix D having square roots of respective singular values $\lambda i$. More specifically, a plurality of communication lines logically independent and spatial-orthogonally multiplexed are realized. Thereby, on the side of the receiver, a plurality of original signal sequences can be extracted completely without crosstalk, so that a logically best performance can be accomplished.

In any of the multi-antenna techniques, when a match is not attained between the transmission and reception directivity patterns of the communication apparatus, the main lobe is directed along the same desired direction both in transmission and reception, even higher throughput is expected. An event in which the transmission and reception directivity patterns match with one another is expressed also with an expression "reversible." For example, in MIMO communication, when a channel matrix in the direction from the transmitter to the receiver is "H_down," and a channel matrix in the direction from the transmitter to the receiver is "H_up," the reversibility is represented by the equation "$H\_up = H\_down^T$" (where T represents the transpose of the matrix).

However, in a practical adaptive array antenna, the reversibility is lost because of, for example, variations in characteristics of the respective elements constituting the transmission and reception systems and in line lengths. As such, even when weight coefficient calculated in the event of reception is used as it is in the event of transmission, a match between the reception directivity pattern and the transmission directivity pattern is not attained.

In the adaptive array antenna, in order to compensate for irreversibility, a correction value calculation process called "calibration" is preliminarily executed, and the correction value acquired by the process is used to correct for the weight coefficient, thereby to attain the match between the reception directivity pattern and the transmission directivity pattern.

Also in the MIMO communication apparatus, spatial transfer functions and transfer functions of analog portions in the device are summed up and recognized in the form of the channel function H in a digital processing portion. Consequently, the reversibility is not established because of differences in the transfer functions of the transmission and reception analog portions. Then, the reversibility has to be established by executing pre-communication calibration of the analog portions.

Antenna calibration methods are broadly classified into, for example, a device-external calibration and a device-internal calibration (or, a self-calibration).

The device-external calibration uses a calibration transmitter/receiver in addition to the adaptive array antenna communication apparatus. When having received a reference signal transmitted from the respective antenna elements of the adaptive array antenna, the transmitter/receiver retransmit the signal. In the adaptive array antenna communication apparatus, the received reference signal looped back from the transmitter/receiver and an original reference signal are compared with one another. Then, variations in the characteristics of respective transmission and reception systems including the antennas and propagation paths are detected and corrected.

In the self-calibration in which the communication apparatus itself compensates for the transfer function, the reference signals generated in the respective transmission systems are looped back to the reception system. Then, the respective received reference signals are compared with original reference signals, and variations in the characteristics of the respective transmission and reception systems including the antennas and propagation paths are detected and corrected.

According to the device-external calibration, since, for example, calibration antennas are necessary in addition to the array antenna, and reference signals looped back via the propagation paths are received, a problem arises in that the calibration is likely to be influenced by, for example, the ambient environment and the signal to noise ratio. The present inventors contemplates that the self-calibration enabling the calibration to be completed within the communication apparatus is preferable.

As an example, an adaptive array antenna such as described hereinbelow has been proposed (see Patent Publication 2, for example). According to the antenna, a portion between each of a plurality of antenna elements is short-circuited, and a reference signal is supplied to one of a plurality of transmitter devices, thereby transmitting the reference signal to an other antenna element from an antenna element corresponding to the transmitter device. Then, a comparison is made between the reference signal received via an antenna element and a reference signal directly transmitted from a reference signal supply device, whereby the characteristics of receiver devices and transmitter devices are evaluated, and weight coefficients are corrected in accordance with the evaluation results. In this case, while the antenna elements are included, appropriate calibration can be implemented without being affected by radio wave propagation environments.

By way of example, the following will describe a system including three transmission and reception branches. A branch number is represented by i, and a transfer function of a transmission analog portion belonging to the i-th branch is represented by Tx(i), the transfer function of a reception analog portion is represented by Rx(i), and a calibration factor to be used as a correction value for the antenna of the respective branch is represented by K(i). In this case, in order to compensate for the transfer function of the respective transmission analog portion, calibration can be executed in such a manner that the correction coefficient K(i) is multiplied with a transmission signal in a digital processing portion. Then, as shown in an expression below, when the ratio between the transmission analog portion and reception analog portion of the respective branch is constant, the calibration is completed.

[Expression 1]

$$\frac{T_x(0) \times K(0)}{R_x(0)} = \frac{T_x(1) \times K(1)}{R_x(1)} = \frac{T_x(2) \times K(2)}{R_x(2)} \quad (1)$$

According to the self-calibration, a calibration factor is acquired by looping back a signal in a communication apparatus of the type including a multi-antenna system. A method for obtaining a calibration factor by using loopback transfer functions acquired from a looped back signal will be described herebelow.

A loopback transfer function to be acquired from the transmission branch i via a reception branch j is represented as D(i,j). For example, in the event of calibration with a 0-th transmission and reception branch being set to a reference branch, loopback transfer functions of paths for transmission from the branch 0 to other branches 1 and 2 and loopback transfer functions of paths looped back from the respective other branches 1 and 2 and for reception at the branch 0 are acquired, as shown in an expression below.

[Expression 2]

$$D(0,1) = T_x(0) \times R_x(1)$$

$$D(0,2) = T_x(0) \times R_x(2)$$

$$D(1,0) = T_x(1) \times R_x(0)$$

$$D(2,0) = T_x(2) \times R_x(0) \quad (2)$$

When a calibration factor K(0) at the branch 0, which is the reference branch, is set to 1.0 that corresponds to reference value, the calibration factors of the respective branches 0 to 2 are represented as shown below.

[Expression 3]

$$K(0) = 1.0 \quad (3)$$

$$K(1) = \frac{D(0,1)}{D(1,0)} = \left\{\frac{R_x(1)}{T_x(1)}\right\} \times \left\{\frac{R_x(0)}{T_x(0)}\right\}$$

$$K(2) = \frac{D(0,2)}{D(2,0)} = \left\{\frac{R_x(2)}{R_x(2)}\right\} \left\{\frac{R_x(0)}{T_x(0)}\right\}$$

When the respective results in Expression (1) are verified, it can be known that, as shown in an expression below, the condition that the ratios between the transfer functions of the transmission analog portions and reception analog portions of the respective branches are constant is satisfied.

[Expression 4]

$$\frac{T_x(0) \times K(0)}{R_x(0)} = \frac{T_x(0)}{R_x(0)} \quad (4)$$
$$\frac{T_x(1) \times K(1)}{R_x(1)} = \frac{T_x(0)}{R_x(0)}$$
$$\frac{T_x(2) \times K(2)}{R_x(2)} = \frac{T_x(0)}{R_x(0)}$$

Since the calibration is executed in accordance with the 0-th branch set to the reference, the calibration factor K(0) of the 0-th branch is 1.0, as shown in Expression (3). Further, the calibration factors K(i) of the other branches respectively take values commonly multiplied with the value "{Tx(0)/Rx(0)}" of the 0-th branch.

In the course of the self-calibration, the loopback for transmitting the reference signal from the reference branch to the other branch, herebelow, will be referred to as "forward loopback." In addition, the loopback for receiving the reference signal looped back from the other branch at the reference branch, hereinbelow, will be referred to as "backward loopback."

It is known to the skilled in the art that there occurs a difference in a synchronizing circuit in an actual communication apparatus simply configured. Because of such a difference in the synchronizing circuit, the transfer function is varied in the event of looping back of a reference signal. In particular, in a case using the OFDM modulation scheme, the circuit has a characteristic in that the amount of phase rotation associated with a synchronization timing delay is different in units of a subcarrier.

When the forward loopback and the backward loopback are finely different from one another, the loopback transfer functions are different in appearance from one another. Variations in the transfer functions due to a difference in the synchronization positions in the forward loopback event and the backward loopback event, respectively, are represented by F and B, the apparent forward loopback transfer function is represented as D(0,1)F, D(0,2)F, and the apparent backward loopback transfer function is represented as D(1,0)B, D(2,0) B.

In the case as described above, when, as shown in Expression (3) with the 0-th branch set to the reference branch, the calibration factors of the respective branches are acquired, the results are represented as shown below.

[Expression 5]

$$K(0) = 1.0 \quad (5)$$
$$K(1) = \frac{D(0,1)F}{D(1,0)B} = \left\{ \frac{R_x(1)}{T_x(1)} \right\} \times \left\{ \frac{R_x(0)}{T_x(0)} \right\} \times \left\{ \frac{F}{B} \right\}$$
$$K(2) = \frac{D(0,2)F}{D(2,0)B} = \left\{ \frac{R_x(2)}{T_x(2)} \right\} \times \left\{ \frac{R_x(0)}{T_x(0)} \right\} \times \left\{ \frac{F}{B} \right\}$$

According to the expression, at the respective branch 1, 2, which is other than the reference branch, {F/B} indicative of the variation in the transfer function due to the difference in the synchronization positions is reflected in the respective calibration factor K(1), K(2). In addition, the ratio between the transfer function of the transmission analog portion and the transfer function of the reception analog portion is constant. Thereby, the calibration condition is satisfied. In comparison, however, in the case of the branch 0 as the reference branch, {F/B} indicative of the variation in the transfer function due to the difference in the synchronization position is not reflected in the calibration factor K(0) thereof. In other words, only the calibration factor of the reference branch has an error.

[Patent Publication 1]
Japanese Unexamined Patent Application Publication No. 2002-44051
[Patent Publication 2]
Japanese Unexamined Patent Application Publication No. 2003-124731
[Non-Patent Publication 1]
http://radio3.ee.uec.ac.jp/MIMO(IEICE_TS).pdf (as of Oct. 24, 2003)

DISCLOSURE OF THE INVENTION

Problems to be Solved by the Invention

An object of the present invention is to provide an excellent wireless communication apparatus including a plurality of antennas and capable of suitably executing calibration to attain a match between directivity patterns of an overall antenna system, an antenna calibration method, and a computer program therefor.

Another object of the present invention is to provide an excellent wireless communication apparatus, antenna calibration method, and computer program capable of suitably compensating for the reversibility of transmission and reception directivities of a multi-antenna system by executing self-calibration with which a compensation process is completed within the apparatus.

Another object of the present invention is to provide an excellent wireless communication apparatus, antenna calibration method, and computer program therefor in which, with any one of transmission and reception branches being set to a reference branch, an accurate per-branch calibration factor can be acquired in accordance with a forward loopback transfer function of a path for transmission from the reference branch to a respective other branch and a backward loopback transfer function of a path for reception at the reference branch looped back from the respective other branch.

Another object of the present invention is to provide an excellent wireless communication apparatus, antenna calibration method, and computer program therefor in which, even when transfer functions in respective forward and backward loopback events vary, accurate per-branch calibration can be executed in accordance with the loopback transfer functions.

Means for Solving the Problems

The present invention is made in view of the problems described above, and a first aspect thereof is a wireless communication apparatus having a multi-antenna configuration including three or more branches each including an antenna element, a transmission analog portion, and a reception analog portion, the wireless communication apparatus being characterized by comprising a reference branch setting means for setting any one of the branches to a reference branch; a forward loopback transfer function acquiring means for acquiring a forward loopback transfer function of a path for transmission to a respective other branch from the reference branch; a backward loopback transfer function acquiring means for acquiring a backward loopback transfer function of a path for transmission to the reference branch from the respective other branch than the reference branch; a calibration factor calculating means for calculating a calibration factor for the respective branch of the branches inclusive of the reference branch in accordance with the forward loopback transfer function and the backward loopback transfer function; and calibration factor correcting means for correcting for an error contained in the calibration factor for the reference branch.

As devices of one type for implementing high throughput wireless communication, a multi-antenna system, such as an adaptive array or MIMO system is known. In a multi-antenna communication apparatus of this type, a reception directivity pattern and a transmission directivity pattern match with one another. More specifically, antenna calibration is executed to compensate for the reversibility. As such, the present inventors consider that the self-calibration not requiring an unnecessary antenna (or addition of an additive device) and less influencing the ambient environment is preferable.

In the self-calibration, the reference signals generated in the respective transmission systems are looped back to the reception system. Then, the respective received reference signals are compared with original reference signals, and variations in the characteristics of the respective transmission and reception systems including the antennas and propagation paths are detected and corrected. In addition, the calibration condition requires that the ratios between the transfer functions of the transmission analog portions and reception analog portions of the respective branches are constant.

However, there occurs the difference in the synchronizing circuit in the communication apparatus simply configured, such that there arises a problem in that synchronization timings of the forward loopback and the backward loopback are finely different from one another when executing the self-calibration. Because of the difference between the synchronization timings, the forward loopback and the backward loopback are finely different from one another, the apparent transfer functions of the forward loopback and the backward loopback vary. Consequently, there is introduced the result in that only the calibration factor for the reference branch contains an error.

On the other hand, as shown in Expression (5), the variation in the transfer function associated with the synchronization position difference is reflected in the calibration factor and the calibration condition is satisfied in between the respective branches.

Accordingly, the wireless communication apparatus of the present invention first sets one of the plurality of branches to a reference branch, acquires a forward loopback transfer function and a backward loopback transfer function, and calculates a per-branch calibration factor in accordance with these transfer functions. In this case, while the calibration condition is satisfied for respective other branches other than the reference branch, the calibration factor for the reference branch contains an error.

Then, the wireless communication apparatus sets a second reference branch from among the other branches than the firstly set reference branch, similarly acquires a forward loopback transfer function and a backward loopback transfer function, and calculates a per-branch calibration factor in accordance with these transfer functions. In this case, while the calibration condition is satisfied for respective other branches other than the second reference branch, the calibration factor for the second reference branch contains an error.

Then, the calibration factor for the reference branch firstly set to the reference branch is corrected in accordance with the calibration factors secondly acquired so that the calibration condition is satisfied for respective other branches. More specifically, for a branch unset to any one of the reference branch and the second reference branch, a value obtained by dividing the firstly acquired calibration factor by the secondly acquired calibration factor is multiplied with the secondly acquired calibration factor for the first reference branch.

In this case, MIMO communication including a plurality of logical channels formed by using spatial multiplexing can be executed by using the three or more branches. Alternatively, an adaptive array antenna can be configured by using the three or more branches.

Further, in the wireless communication apparatus, an OFDM modulation scheme may be adapted as a primary modulation scheme. In the case the OFDM modulation scheme is used, the apparatus has a characteristic that the amount of phase rotation associated with the synchronization timing difference is different in units of the subcarrier. However, according to the present invention, the transfer functions vary in association with the difference between the synchronization timings, so that the calibration factor error occurring in the reference branch can be well suitably corrected.

Further, a second aspect of the present invention is a computer program described in a computer-readable form to execute an antenna calibration process in a computer system in a wireless communication apparatus having a multi-antenna configuration including three or more branches each including an antenna element, a transmission analog portion, and a reception analog portion, the computer program being characterized by causing the computer system to execute a first loopback transfer function acquiring step for setting any one of the branches to a first reference branch, acquiring a forward loopback transfer function of a path for transmission to a respective other branch from the first reference branch, and acquiring a backward loopback transfer function of a path for transmission to the first reference branch from the respective other branch than the first reference branch; a first calibration factor calculating step for calculating a calibration factor for the respective branch of the branches inclusive of the first reference branch in accordance with the forward loopback transfer function and the backward loopback transfer function, both acquired at the first loopback transfer function acquiring step; a second loopback transfer function acquiring step for setting any one of the other branches than the first reference branch to a second reference branch, acquiring a forward loopback transfer function of a path for transmission to a respective other branch from the second reference branch, and acquiring a backward loopback transfer function of a path for transmission to the second reference branch from the respective other branch than the second reference branch; a second calibration factor calculating step for calculating a calibration factor for the respective branch of the branches inclusive of the second reference branch in accordance with the forward loopback transfer function and the backward loopback transfer function, both acquired at the second loopback transfer function acquiring step; and a calibration factor correcting step for executing correction so that the calibration factor for the first reference branch acquired at the first calibration factor calculating step, in accordance with the calculation result of the second calibration factor calculating step, satisfies a calibration condition in a relationship with the respective other branch.

The computer program according to the second aspect is defined as a computer program described in a computer-readable form to execute a predetermined process in a computer system. In an other expression, when the computer program according to the second aspect of the present invention is installed in the computer system, cooperative operation is exhibited in the computer system, whereby the antenna calibration in the wireless communication apparatus having a multi-antenna configuration according to the first aspect of the present invention can be implemented.

Effects/Advantages of the Invention

According to the present invention, it is possible to provide an excellent wireless communication apparatus, antenna calibration method, and computer program capable of suitably compensating for the reversibility of transmission and reception directivities of a multi-antenna system by executing self-calibration with which a compensation process is completed within the apparatus.

Further, according to the present invention, it is possible to provide an excellent wireless communication apparatus, antenna calibration method, and computer program therefor in which, with any one of transmission and reception branches being set to a reference branch, an accurate per-branch calibration factor can be acquired in accordance with a forward loopback transfer function of a path for transmission from the reference branch to a respective other branch and a backward loopback transfer function of a path for reception at the reference branch looped back from the respective other branch.

Further, according to the present invention, it is possible to provide an excellent wireless communication apparatus, antenna calibration method, and computer program therefor in which, even when transfer functions in respective forward and backward loopback events vary because of the difference between the synchronization timings, accurate calibration can be executed in accordance with the loopback transfer functions.

When executing the self-calibration of the multi-antenna system according to the present invention, since attention does not have to be paid on the synchronization position of the reference signal, the calibration factors can be easily acquired.

Other objects, features, and advantages of the present invention are apparent from the following detailed description of the embodiment and accompanying drawings.

BRIEF DESCRIPTION OF REFERENCE NUMERALS

Figure 1:
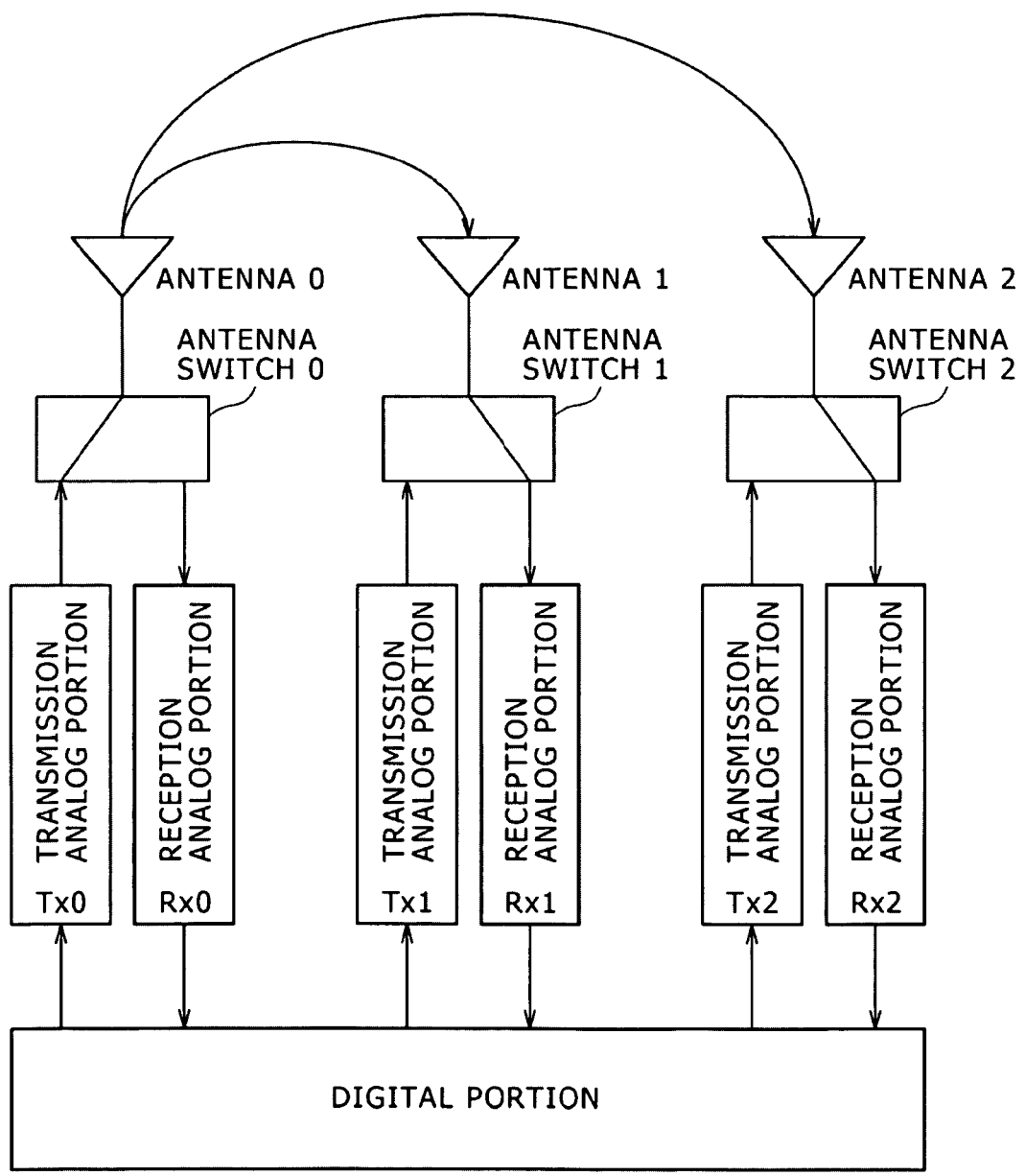
FIG. 1 is a view showing the manner of executing forward loopback processing in a wireless communication apparatus including three branches 0 to 2.

11 A/D convertor portion
12 Synchronizer portion
13 Transfer function acquiring portion
14 Calibration factor acquiring portion
21 Data generating portion;
22 Reference signal generating portion
23 Calibration factor multiplying portion
24 D/A convertor portion

BEST MODE FOR CARRYING OUT THE INVENTION

An embodiment of the present invention will be described in detail herebelow with reference to the drawings.

The present embodiment relates to a wireless communication apparatus with a multi-antenna configuration that includes three or more transmission and reception branches. A multi-antenna system is capable of realizing processes, such as MIMO communication with a plurality of logical channels being formed using spatial multiplexing, and high throughput wireless communication by forming an adaptive array antenna, for example. However, since such matters regarding data communication schemes per se are not directly related to the essential to the present invention, such matters will not be further described herein.

In multi-antenna communication apparatus, a match between a reception directivity pattern and a transmission directivity pattern is not attained because of a difference between transfer functions of respective transmission and reception analog portions, that is, the reversibility is not attained. As such, antenna calibration for compensating for the reversibility has to be carried out. In the wireless communication apparatus of the present embodiment employs self-calibration with which the calibration process is completed within the apparatus without relying upon external devices.

In order to compensate for the transfer function of the transmission and reception analog portions, the calibration is executed in the manner that a correction coefficient K is multiplied with a transmission signal in a digital processing portion. Then, when the ratio between the transmission analog portion and reception analog portion of the respective branch is constant, the calibration is completed. More specifically, the calibration condition is set to satisfy Expression (1) shown above, where the branch number is i, the transfer function of the transmission analog portion belonging to the i-th branch is $Tx(i)$, the transfer function of the reception analog portion is $Rx(i)$, and the calibration factor to be used as the correction value for the respective antenna is $K(i)$.

According to the self-calibration, a calibration factor is acquired through looping back of a signal in a communication apparatus of the type including a multi-antenna system. More specifically, with any one of transmission and reception branches being set as a reference branch, a forward loopback transfer function of a path for transmission from the reference branch to a respective other branch and a backward loopback transfer function of a path for transmission to the reference branch from the respective branch other than the reference branch are acquired. Then, in accordance with these loopback transfer functions, and a calibration factor for the respective one of the branches, which are inclusive of the reference branch, are calculated.

Figure 2:
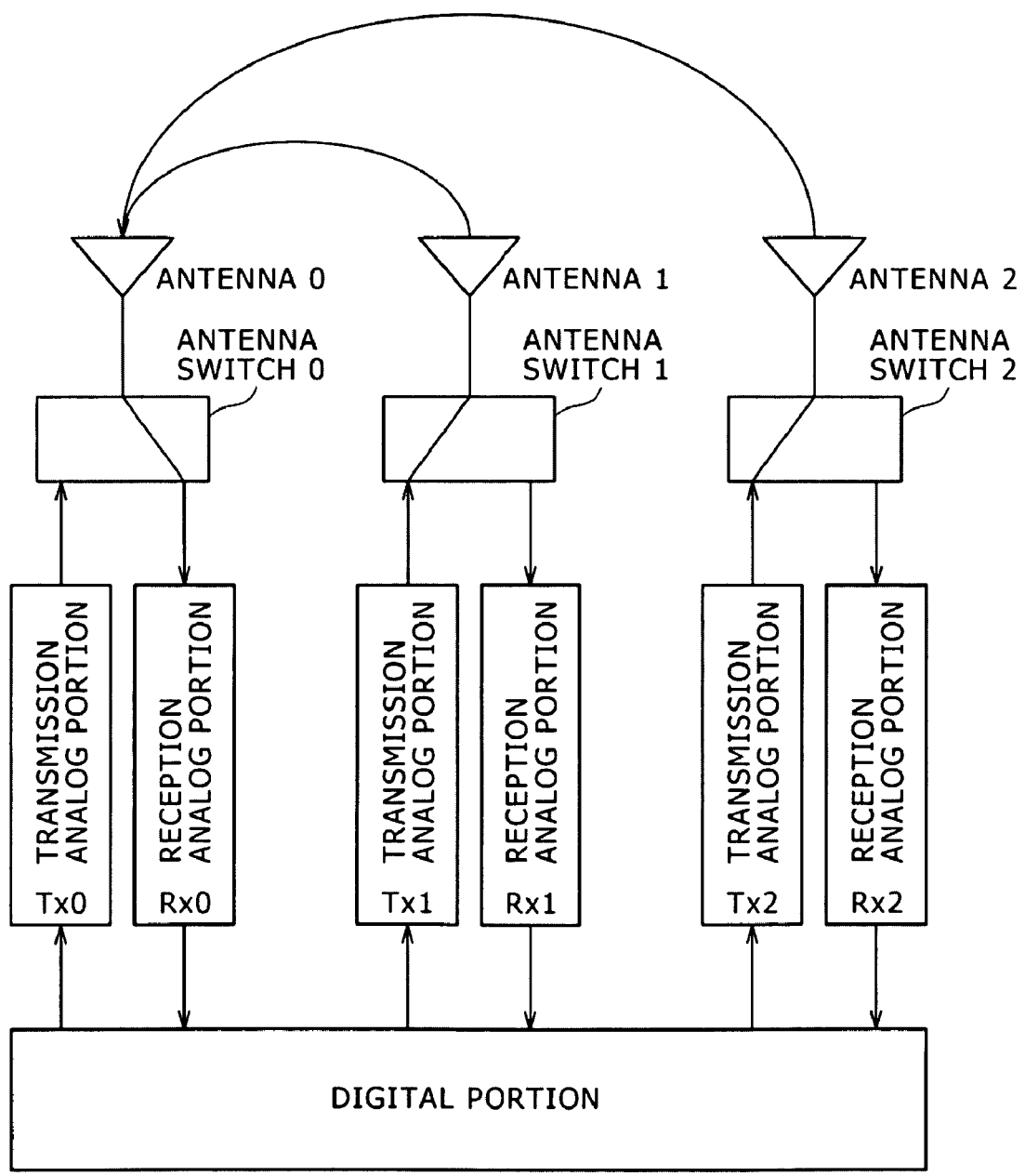
FIG. 2 is a view showing the manner of executing backward loopback processing the wireless communication apparatus including the three branches 0 to 2.

FIGS. 1 and 2, respectively, show the manner of executing forward and backward loopback processing in a wireless communication apparatus including three branches 0 to 2.

The respective branches 0 to 2 include transmission analog portions Tx0 to Tx1 and reception analog portions Rx0 to Rx2. Connection to the respective branches 0 to 2 is switched by antenna switches 0 to 2 in response to a transmission/reception timing of a reference signal. In addition, in a digital portion, digital processing is executed for a transmitted or received signal in the respective one of the branches 0 to 2.

In the respective transmission analog portion, a transmission signal analog-converted is RF-processed and upconverted in frequency to an appropriate frequency band, and then the signal is transmitted to a propagation path from the antenna via the antenna switch. For example, in the case of MIMO communication, the signal is spatially multiplexed and transmitted to the propagation path from the respective antenna. In addition, in the respective reception analog portion, a wireless signal via the respective antenna is RF-processed and downconverted.

In the examples shown in FIGS. 1 and 2, the branch 0 is set to the reference branch. More specifically, in FIG. 1, the antenna is connected to the transmission branch at only the branch 0, and the antennas are connected to the reception branches at the other branches 1 and 2. Thereby, forward loopback paths for looping back and receiving reference signals, which have been transmitted from the branch 0, at the other branches 1 and 2 are formed, and forward loopback transfer functions are acquired in the digital portion.

In addition, in FIG. 2, at only the branch 0, the antenna is connected to the reception branch, and at the other branches 1 and 2, the antennas are connected to the transmission branches. Thereby, backward loopback paths for looped back and received reference signals, which have been transmitted from the branches 1 and 2, at the branch 0 are formed, and backward loopback transfer functions are acquired in the digital portion.

Thus, in the respective examples shown in FIGS. 1 and 2, the reference signal is dispatched from the respective antenna to obtain a loopback signal. However, the configuration may be such that a looping back device for looping back from the transmission analog portion to the reception analog portion between the respective branch is provided before the antenna switch to execute the loopback processing within an analog circuit without dispatching the wireless signal from the respective antenna.

In the digital portion, digital processing is executed for transmitted and received signals at the respective transmission and reception branches 0 to 2. In the present embodiment, the digital processing portion acquires the forward loopback transfer function and backward loopback transfer function obtainable from the looped back reference signal, and per-branch calibration factors K(0) to K(2) for compensating for transfer functions of the analog portions are acquired in accordance with these loopback transfer functions. Then, in the data transmission event, the calibration factors K(0) to K(2) are multiplied with transmission signals to the respective transmission branches, thereby to execute the calibration so as to satisfy the reversibility.

Figure 3:
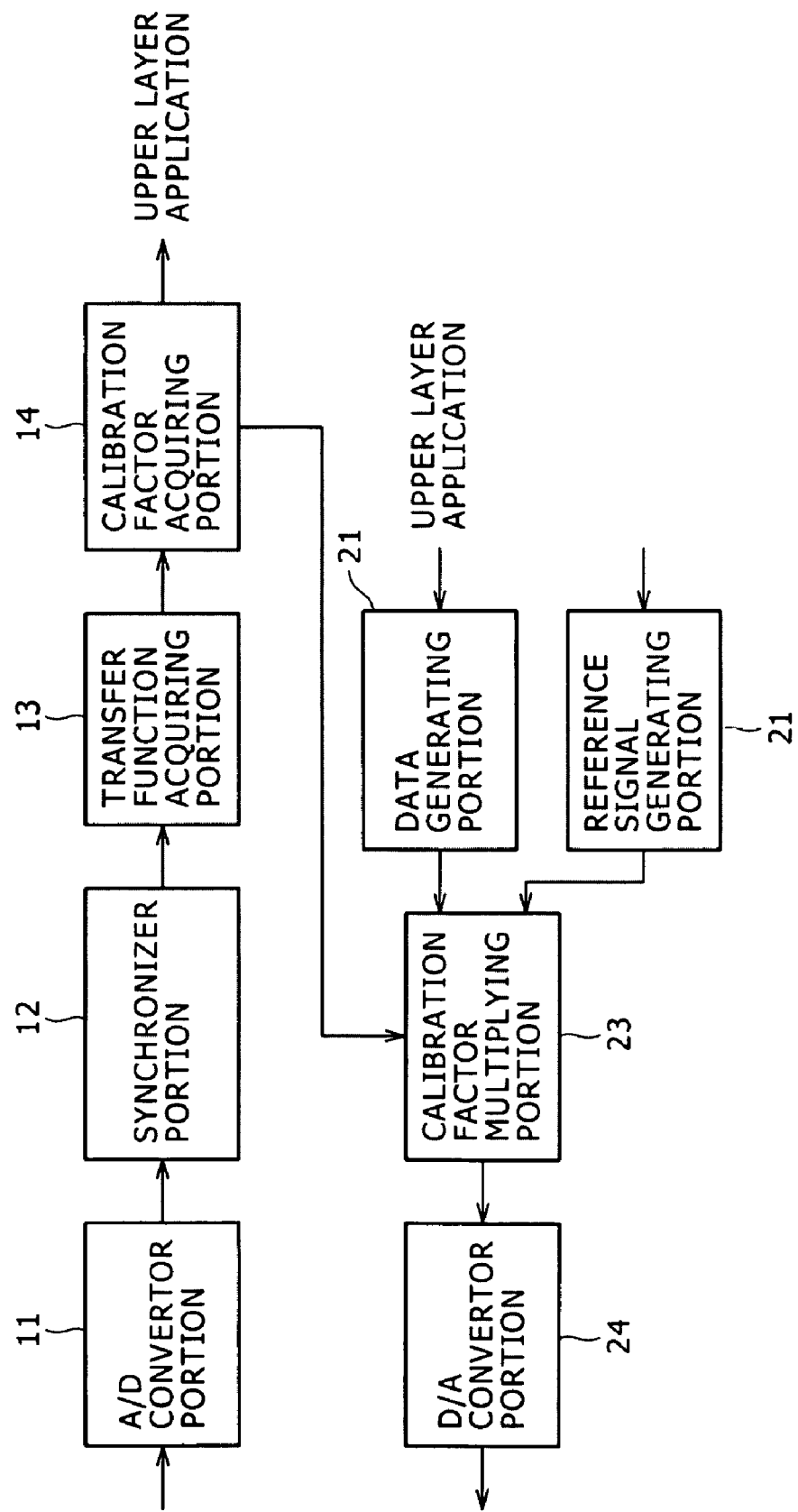
FIG. 3 is a view showing an interior configuration of a digital portion.

FIG. 3 shows an interior configuration of the digital portion.

A reception system of the digital portion includes an A/D convertor portion 11, a synchronizer portion 12, a transfer function acquiring portion 13, and a calibration factor acquiring portion 14. In addition, a baseband signal downconverted in the reception analog portion is A/D converted to a digital signal, and band limitation is executed by digital filtering. Thereafter, processes, such as packet detection, synchronous acquirement, and frequency offset correction are executed. When the OFDM transmission scheme is employed, FFT is executed by executing OFDM demodulation. Thereby, a signal on the time axis is converted to a signal on the frequency axis, demodulation corresponding to a respective modulation scheme is executed for a respective subcarrier, and parallel/serial conversion is executed to thereby regenerate a respective serial reception signal stream transmitted as an original serial signal. In addition, in a calibration process phase, a same known signal is multiplied with reference signals looped back and received from the other branches, and the transfer functions of the forward loopback and backward loopback between each branch are acquired. Then, by using these loopback transfer functions, the calibration factor acquiring portion 14 acquires the calibration factors K(0) to K(2) of the analog portions of the respective branches, and sets them into a calibration factor multiplying portion 23.

A transmission system of the digital portion includes a data generating portion 21, a reference signal generating portion 22, a calibration factor multiplying portion 23, and a D/A convertor portion 24. In addition, the data generating portion 21 distributes transmission data supplied from an upper layer application into per-branch serial transmission signal streams. The reference signal generating portion 22 generates reference signals that are looped back and received between the branches. In the data transmission phase, the calibration factor multiplying portion 23 multiplies the calibration factors K(0) to K(2) with the transmission signals for transmission to the respective transmission branches, thereby to execute the calibration. In addition, in the case the OFDM transmission scheme is employed, a plural items of data that are output through serial/parallel conversion of respective serial transmission signal streams in units of a symbol frequency, which is slower than the information transmission rate, are allocated to the respective subcarriers. Then, the data are modulated in amplitude and phase in units of the subcarrier, and the plurality of subcarriers are subjected to the inverse FFT, whereby the data are converted to signals arranged on the time axis while maintaining the orthogonality of the respective subcarriers arranged in the frequency domain. Subsequently, band limitation through digital filtering, and D/A conversions are executed.

A calculation process for calibration factors in the digital portion will be described in detail hereinbelow.

In the case a loopback transfer function to be obtained from the transmission branch i via a reception branch j is represented as D(i,j), the calibration factor for the respective branches in, for example, a wireless communication system including three transmission/reception antennas are presented as Expression (3) described above. Since the calibration is executed with the 0-th branch (branch 0) being set to the reference branch, the calibration factor K(0) of the branch 0 is 1.0. Further, the calibration factors K(i) of the other branches respectively take values commonly multiplied with the value "{Tx(0)/Rx(0)}" of the 0-th branch.

A difference occurs in a synchronizing circuit in an actual communication apparatus simply configured. Because of such a difference in the synchronizing circuit, the transfer function is varied in the event of looping back of a reference signal. In particular, in a case using the OFDM modulation scheme, the circuit has a characteristic in that the amount of phase rotation associated with a synchronization timing delay is different in units of the subcarrier. When the forward loopback and the backward loopback are finely different from one another, the loopback transfer functions are different in appearance from one another. When variations are caused in the transfer functions of the forward loopback and the backward loopback due to the difference in the synchronization position, a problem occurs in that error takes place in the calibration factors.

Variations in the transfer function due to a difference in the synchronization positions in the forward loopback event and the backward loopback event, respectively, are represented by F and B, which is other than the reference branch, {F/B} indicative of the variation in the transfer function due to the difference in the synchronization positions is reflected in the respective calibration factor K(1), K(2), as shown in Expression (5). However, in the case of the branch 0 as the reference branch, {F/B} indicative of the variation in the transfer function due to the difference in the synchronization position is not reflected in the calibration factor K(0) thereof, so that the calibration factor has an error.

In the present embodiment, attention is drawn to the fact that, the variations in the transfer function due to the difference in the synchronization position are reflected in the calibration factors in between the respective branches other than the reference branch are reflected, and the calibration condition is satisfied. Thereby, the embodiment is arranged to execute error correction of the calibration factors for the reference branch.

First, the branch 0 is set to the reference branch, forward and backward loopback transfer functions are obtained, and calibration factors for the respective branches are calculated in accordance with the obtained transfer functions. The respective calibration factors obtained with the branch 0 set to the reference branch are represented as K(0)_0, K(1)_0, and K(2)_0. In this case, although K(0)_0 has an error, the relative relationship between K(1)_0 and K(2)_0 is correct, and the calibration condition is satisfied.

Subsequently, the branch 1 is set to the reference branch, forward and backward loopback transfer functions are obtained, and calibration factors for the respective branches are calculated in accordance with the obtained transfer functions. The respective calibration factors obtained with the branch 1 set to the reference branch are represented as K(0)_1, K(1)_1, K(2)_1. In this case, although K(1)_1 has an error, the relative relationship between K(0)_1 and K(2)_1 is correct, and the calibration condition is satisfied.

The two sets of calibration factors acquired using the two reference antennas are phase rotated to equalize the calibration factors K(2). Thereby final calibration factors are acquired as shown below.

[Expression 6]

$$K(1) = K(1)\_0$$
$$K(2) = K(2)\_0$$
$$K(0) = K(0)\_1 \times \left\{ \frac{K(2)\_0}{K(2)\_1} \right\} \quad (6)$$

In the expression, the respective calibration factors obtained with the branch 0 set to the reference branch are employed for the branches 1 and 2. In addition, for the branch 0, the correction is made in the manner that the value obtained by dividing the firstly obtained calibration factor K(2)_0 for the branch 2 unset to the reference branch is divided by the secondly obtained calibration factor K(2)_1 is multiplied with the calibration factor K(0)_1 for the branch 0.

When the calibration factors K(0) to K(2) are obtained with the branch 0 being set to the reference branch, the following results are obtained. In this case, the respective variations in the transfer functions due to the difference in the synchronization position in the forward loopback event and the backward loopback event are represented by F and B.

[Expression 7]

$$K(0)\_0 = 1.0 \quad (7)$$
$$K(1)\_0 = \frac{D(0,1)F}{D(1,0)B} = \left\{\frac{R_x(1)}{T_x(1)}\right\} \times \left\{\frac{R_x(0)}{T_x(0)}\right\} \times \left\{\frac{F}{B}\right\}$$
$$K(2)\_0 = \frac{D(0,2)F}{D(2,0)B} = \left\{\frac{R_x(2)}{T_x(2)}\right\} \times \left\{\frac{R_x(0)}{T_x(0)}\right\} \times \left\{\frac{F}{B}\right\}$$

When the calibration factors K(0) to K(2) are obtained with the branch 1 being set to the reference branch, the results are as shown below.

[Expression 8]

$$K(0)\_1 = \frac{D(1,0)F}{D(0,1)B} = \left\{\frac{R_x(0)}{T_x(0)}\right\} \times \left\{\frac{R_x(1)}{T_x(1)}\right\} \times \left\{\frac{F}{B}\right\} \quad (8)$$
$$K(1)\_1 = 1.0$$
$$K(2)\_1 = \frac{D(1,2)F}{D(2,1)B} = \left\{\frac{R_x(2)}{T_x(2)}\right\} \times \left\{\frac{R_x(1)}{T_x(1)}\right\} \times \left\{\frac{F}{B}\right\}$$

For the branches 1 and 2, the calibration factors obtained with the branch 0 set to the reference branch, as shown below, are used as they are.

[Expression 9]

$$K(1) = \frac{D(0,1)F}{D(1,0)B} = \left\{\frac{R_x(1)}{T_x(1)}\right\} \times \left\{\frac{R_x(0)}{T_x(0)}\right\} \times \left\{\frac{F}{B}\right\} \quad (9)$$
$$K(2) = \frac{D(0,2)F}{D(2,0)B} = \left\{\frac{R_x(2)}{T_x(2)}\right\} \times \left\{\frac{R_x(0)}{T_x(0)}\right\} \times \left\{\frac{F}{B}\right\}$$

On the other hand, the calibration factor K(0) for the branch 0 is obtained as shown in an expression shown herebelow. This corresponds to the fact that two sets of calibration factors obtained by using two reference antennas are phase rotated to equalize the calibration factors K(2).

[Expression 10]

$$K(0) = K(0)\_1 \times \left\{\frac{K(2)\_0}{K(2)\_1}\right\} \quad (10)$$
$$= \frac{D(1,0)F}{D(0,1)B}$$
$$= \left\{\frac{R_x(0)}{T_x(0)}\right\} \times \left\{\frac{R_x(1)}{T_x(1)}\right\} \times \left\{\frac{F}{B}\right\} \times \left\{\frac{T_x(0)}{R_x(0)}\right\} \times \left\{\frac{T_x(1)}{R_x(1)}\right\}$$
$$= \left\{\frac{F}{B}\right\}$$

Accordingly, the final calibration factors shown in Expression (6) are expressed as below.

[Expression 11]

$$K(0) = 1.0 \times \left\{\frac{F}{B}\right\} \quad (11)$$
$$K(1) = \frac{D(0,1)F}{D(1,0)B} = \left\{\frac{R_x(1)}{T_x(1)}\right\} \times \left\{\frac{R_x(0)}{T_x(0)}\right\} \times \left\{\frac{F}{B}\right\}$$
$$K(2) = \frac{D(0,2)F}{D(2,0)B} = \left\{\frac{R_x(2)}{T_x(2)}\right\} \times \left\{\frac{R_x(0)}{T_x(0)}\right\} \times \left\{\frac{F}{B}\right\}$$

When the above is verified, the result is obtained as in an expression shown below, so that it can be known that the calibration condition is satisfied.

[Expression 12]

$$\frac{T_x(0) \times K(0)}{R_x(0)} = \frac{T_x(0)}{R_x(0)} \times \left\{\frac{F}{B}\right\}$$
$$\frac{T_x(1) \times K(1)}{R_x(1)} = \frac{T_x(0)}{R_x(0)} \times \left\{\frac{F}{B}\right\}$$
$$\frac{T_x(2) \times K(2)}{R_x(2)} = \frac{T_x(0)}{R_x(0)} \times \left\{\frac{F}{B}\right\}$$
(12)

The operation procedures for the antenna calibration and the data transmission in the multi-antenna wireless communication apparatus of the present embodiment will be summarized herebelow.

Step 0: The branch 0 is set to the reference branch, and a reference signal is transmitted from the branch 0.

Step 1: The respective forward loopback transfer functions D(0,1)F and D(0,2)F for the branches 1 and 2 are acquired and stored.

Step 2: The reference signal is transmitted from the branch 1.

Step 3: The backward loopback transfer function D(1,0)B for the branch 0 is acquired and stored.

Step 4: The reference signal is transmitted from the branch 2.

Step 5: The backward loopback transfer function D(2,0)B for the branch 0 is acquired and stored.

Step 6: The branch 1 is set to the reference branch, and the same operations as those at steps 0 to 5 are executed. As a result, the transfer functions D(1,0)F, D(1,2)F, D(2,1)B, and D(0,1)B are acquired and stored.

Step 7: By use of the calibration factor obtained with the branch 0 set to the reference branch and the calibration factor obtained with the branch 1 set to the reference branch, calibration factors for the respective branches 0 to 2 are calculated in accordance with Expression (6).

Step 8: In the data transmission event, the acquired calibration factors are multiplied and transmitted.

INDUSTRIAL APPLICABILITY

As above, the present invention has been described in detail with reference to the specific embodiment. However, it is self-evident that the skilled in the art is able to make modifications, alternatives, and the like to the embodiment without departing from the spirit and scope of the invention. That is, the present invention has been disclosed by way of example, and hence the contents of description in the present description should not be taken in a limited sense. In order to determine the scope of the invention, the appended claims should be referenced.

The invention claimed is:

1. A wireless communication apparatus having a multi-antenna configuration including three or more branches each including an antenna element, a transmission analog portion, and a reception analog portion, the wireless communication apparatus being characterized by comprising:
reference branch setting means for setting any one of the branches to a reference branch;
forward loopback transfer function acquiring means for acquiring a forward loopback transfer function of a path for transmission to a respective other branch from the reference branch;
backward loopback transfer function acquiring means for acquiring a backward loopback transfer function of a path for transmission to the reference branch from the respective other branch than the reference branch;
calibration factor calculating means for calculating a calibration factor for the respective branch of the branches inclusive of the reference branch in accordance with the forward loopback transfer function and the backward loopback transfer function; and
calibration factor correcting means for correcting for an error contained in the calibration factor for the reference branch.

2. The wireless communication apparatus as described in claim 1, characterized in that, after calculating per-branch calibration factors in accordance with forward loopback transfer functions and backward loopback transfer functions acquired by setting one of the plurality of branches to the reference branch, the calibration factor correcting means further recalculates per-branch calibration factors in accordance with forward loopback transfer functions and backward loopback transfer functions acquired by resetting a reference branch from among other branches than the branch firstly set to the reference branch; and corrects the calibration factor for the branch firstly set to the reference branch in accordance with the calibration factors secondly acquired so that a calibration condition is satisfied.

3. The wireless communication apparatus as described in claim 2, characterized in that the correction of the calibration factor is executed in a manner that, for a branch unset to any one of the reference branch and the second reference branch, a value obtained by dividing the firstly acquired calibration factor by the secondly acquired calibration factor is multiplied with the secondly acquired calibration factor for the first reference branch.

4. The wireless communication apparatus as described in claim 1, characterized in that MIMO (Multi-Input Multi-Output) communication including a plurality of logical channels formed by using spatial multiplexing is executed by using the three or more branches.

5. The wireless communication apparatus as described in claim 1, characterized in that an adaptive array antenna is configured by using the three or more branches.

6. The wireless communication apparatus as described in claim 1, characterized in that an OFDM (Orthogonal Frequency Division Multiplexing) modulation scheme is adapted as a primary modulation scheme.

7. An antenna calibration method for a wireless communication apparatus having a multi-antenna configuration including three or more branches each including an antenna element, a transmission analog portion, and a reception analog portion, the antenna calibration method being characterized by comprising:
a first loopback transfer function acquiring step for setting any one of the branches to a first reference branch, acquiring a forward loopback transfer function of a path for transmission to a respective other branch from the first reference branch, and acquiring a backward loopback transfer function of a path for transmission to the first reference branch from the respective other branch than the first reference branch;
a first calibration factor calculating step for calculating a calibration factor for the respective branch of the branches inclusive of the first reference branch in accordance with the forward loopback transfer function and the backward loopback transfer function, both acquired at the first loopback transfer function acquiring step;
a second loopback transfer function acquiring step for setting any one of the other branches than the first reference branch to a second reference branch, acquiring a forward loopback transfer function of a path for transmission to a respective other branch from the second reference branch, and acquiring a backward loopback transfer function of a path for transmission to the second reference branch from the respective other branch than the second reference branch;

a second calibration factor calculating step for calculating a calibration factor for the respective branch of the branches inclusive of the second reference branch in accordance with the forward loopback transfer function and the backward loopback transfer function, both acquired at the second loopback transfer function acquiring step; and a calibration factor correcting step for executing correction so that the calibration factor for the first reference branch, calculated at the first calibration factor calculating step, in accordance with the calculation result of the second calibration factor calculating step satisfies a calibration condition in a relationship with the respective other branch.

8. The wireless communication method as described in claim 7, characterized in that the correction of the calibration factor is executed at the calibration factor correcting step in a manner that, for a branch unset to any one of the first reference branch and the second reference branch, a value obtained by dividing the calibration factor acquired at the first calibration factor calculating step by the calibration factor acquired at the second calibration factor calculating step is multiplied with the calibration factor acquired at the second calibration factor calculating step for the first reference branch.

9. A computer program embodied in a non-transitory computer readable medium to execute an antenna calibration process in a computer system in a wireless communication apparatus having a multi-antenna configuration including three or more branches each including an antenna element, a transmission analog portion, and a reception analog portion, the computer program being characterized by causing the computer system to execute:

a first loopback transfer function acquiring step for setting any one of the branches to a first reference branch, acquiring a forward loopback transfer function of a path for transmission to a respective other branch from the first reference branch, and acquiring a backward loopback transfer function of a path for transmission to the reference branch from the respective other branch than the first reference branch;

a first calibration factor calculating step for calculating a calibration factor for the respective branch of the branches inclusive of the first reference branch in accordance with the forward loopback transfer function and the backward loopback transfer function, both acquired at the first loopback transfer function acquiring step;

a second loopback transfer function acquiring step for setting any one of the other branches than the first reference branch to a second reference branch, acquiring a forward loopback transfer function of a path for transmission to a respective other branch from the second reference branch, and acquiring a backward loopback transfer function of a path for transmission to the second reference branch from the respective other branch than the second reference branch;

a second calibration factor calculating step for calculating a calibration factor for the respective branch of the branches inclusive of the second reference branch in accordance with the forward loopback transfer function and the backward loopback transfer function, both acquired at the second loopback transfer function acquiring step; and a calibration factor correcting step for executing correction so that the calibration factor for the first reference branch acquired at the first calibration factor calculating step, in accordance with the calculation result of the second calibration factor calculating step, satisfies a calibration condition in a relationship with the respective other branch.

* * * * *